United States Patent

[11] 3,607,369

| [72] | Inventor | Louis Bela Batta<br>Grand Island, N.Y. |
|------|----------|----------------------------------------|
| [21] | Appl. No. | 759,204 |
| [22] | Filed | Sept. 11, 1968 |
| [45] | Patented | Sept. 21, 1971 |
| [73] | Assignee | Union Carbide Corporation<br>New York, N.Y. |

[54] METHOD FOR FORMING POROUS ALUMINUM LAYER
10 Claims, No Drawings

[52] U.S. Cl. .................................................. 117/119,
106/1, 117/131
[51] Int. Cl. ...................................................... C23c 17/00
[50] Field of Search ........................................... 117/131, 46
CA, 46 FA, 119, 22, 160

[56] References Cited
UNITED STATES PATENTS

| 1,155,974 | 10/1915 | Van Aller | 117/22 X |
| 1,817,888 | 8/1931 | Lowe | 117/131 |
| 2,323,169 | 6/1943 | Wagenhals | 117/22 |
| 2,541,813 | 2/1951 | Frisch et al. | 117/131 X |
| 2,694,647 | 11/1954 | Cole | 117/22 |
| 2,763,921 | 9/1956 | Turner, Jr. | 117/22 X |
| 2,885,304 | 5/1959 | Thomson et al. | 117/46 CA |
| 2,927,043 | 3/1960 | Stetson | 117/131 X |
| 3,041,206 | 6/1962 | Long et al. | 117/131 |
| 3,091,029 | 5/1963 | Davis et al. | 117/131 X |

FOREIGN PATENTS

| 791,502 | 3/1958 | Great Britain | 117/22 |
| 980,727 | 1/1965 | Great Britain | 117/46 CA |

Primary Examiner—Alfred L. Leavitt
Assistant Examiner—J. R. Batten, Jr.
Attorneys—Paul A. Rose, Thomas I. O'Brien, John C. Le Fever and Lawrence G. Kastriner

ABSTRACT: A method for forming a thin porous aluminum layer of interstitial and interconnected small pores on aluminum base material by mixing a slurry including a selected elemental bonding component, and aluminum powder matrix, a relatively insoluble aluminum brazing flux, and a vehicle, loosely coating the base material with the slurry, drying the coating and thereafter brazing the coating together and to the base material.

METHOD FOR FORMING POROUS ALUMINUM LAYER

BACKGROUND OF THE INVENTION

This invention relates to a method for forming a thin porous aluminum layer on aluminum base material.

A thin layer of metal particles bonded together and to a metal base material as a uniform matrix with interstitial interconnected pores of equivalent pore radii between 0.1 and 4.5 mils is described in U.S. Pat. No. 3,384,154 issued May 21, 1968 to R. M. Milton. This patent also demonstrates that the porous layer is highly effective for transferring heat from a heat source thermally associated with the base material to boiling liquid within the layer; heat transfer coefficients were obtained on the order of 10 times greater than those for mechanically roughened surfaces.

The Milton patent describes a method for preparing porous heat transfer layers by sintering a metal powder matrix component onto the base material, using a plastic binder for initial adhesion of the particles from a slurry. Sintering is accomplished by raising the temperature of the coated surface to the softening point of the base metal and the matrix component.

While this method is suitable for most metals including copper and nickel, it is not satisfactory for aluminum and aluminum-base alloys. This is because aluminum surfaces become oxidized almost immediately upon exposure to air, and the aluminum oxide surface coating is very difficult to remove. The powders required for preparation of porous surfaces are characterized by immense surface area making them particularly susceptible to oxygen attack. Aluminum surfaces containing continuous oxide coatings cannot be successfully sintered.

True sintering (without an alloying or bonding metal) can be accomplished with aluminum by heating the aluminum powder while under a high compression of several tons per square inch. The compression abrades the oxide coating from the particle contact areas and presents bright metal surfaces in such contact areas which can be fused together. However, this method does not lend itself to the production of a porous boiling surface; first, because heavy compaction tends to close the voids and subsurface interconnections needed by the boiling mechanism, and second, because the surfaces of many heat transfer walls due to their geometry cannot readily be held under high compression during sintering.

Another disadvantage of the sintering method is that while it might be successfully used for applying the porous layer to tubes or plates before assembly of the same into a heat exchanger, the method is often unsatisfactory when the porous layer is to be formed after the heat exchanger assembly is complete. For example, such assembly may include brazed joints which soften or melt below the required sintering temperature for preparing the porous layer according to the prior art.

By way of illustration, the plate-and-fin aluminum heat exchangers are normally of brazed construction. The brazing material fuses at about 1,105°–1,120° F., while the temperature required to sinter aluminum within a reasonable time period may equal or exceed this temperature. Clearly then, porous layers cannot be formed on preassembled plate-and-fin aluminum heat exchangers of brazed construction by the sintering method, even if the aforementioned oxide problem were overcome.

Another disadvantage of the sintering method for forming porous layers is the requirement of precise uniform temperatures to avoid overheating and melting. It is difficult to heat complex large heat exchanger assemblies to such precise uniform temperatures close to the melting point of critical members of the structure.

It is an object of this invention to provide an improved method for forming a thin porous aluminum layer on aluminum base material.

Another object is to provide a method which does not require the high bonding temperature characteristic of the prior art sintering methods for forming porous layers.

Still another object is to provide a method for forming aluminum porous layers on assembled aluminum heat exchangers of brazed construction.

Other objects and advantages of this invention will be apparent from the ensuing disclosure and appended claims.

SUMMARY

In the instant method four essential components are provided, one being the cleaned powder matrix component having at least some particles sufficiently small to pass through a 35-mesh screen and selected from the group consisting of aluminum and brazable aluminum-base alloys. The matrix material is the component that actually forms most of the porous layer structure.

Another essential material is the elemental metal bonding component in powder form and in quantity such that the molar ratio thereof to the matrix component is between about 0.02 and 0.15. The elemental metal bonding component is selected from the group consisting of zinc and aluminum alloy having 7 to 13 percent by weight silicon. This component, preferably zinc, has a lower melting point than the matrix material. The bonding component wets the matrix component powder at near the brazing temperature and diffuses rapidly into the particles to form an alloy on at least the surface of the powder particles having a relatively low melting temperature, e.g., 970°–1,000° F. in the case of aluminum and zinc.

A third essential component is brazing flux powder including alkali metal chloride as the major constituent, and reactive metal halide and metal fluoride as minor constituents. The molar ratio of the reactive metal to the matrix component is less than 0.1, and the molar ratio of the elemental metal bonding component plus the reactive metal to the matrix component is between 0.05 and .20. The function of the brazing flux is to remove oxide films from the base material and matrix component so as to expose bright clean surfaces which are easily wetted by the bonding component. The chlorides of alkali metals, e.g., NaCl, KCl, and LiCl, act as a fluid carrier or solvent for the more active components. They also shield the newly cleaned aluminum surfaces from contact with air. The reactive metal halide loosens the oxide film by controlled "etching" of the base and matrix metal. By its decomposition, it also provides part of the bonding metal to form the aforementioned relatively low melting alloy with the matrix component. The metal fluoride is present to promote aluminum oxide solution in the molten flux.

The fourth essential component is a vehicle preferably organic for the first three components which temporarily suspends the ingredients and forms a paintlike mixture or slurry.

The cleaned base material, aluminum or aluminum alloys, is loosely coated with the slurry, and the slurry-coated base material heated to temperature below 300° F. and sufficient to evaporate the vehicle and form a dried metal coating. The metal-coated base material is further heated in an inert atmosphere to temperature between about 950° and 1,200° F. and for sufficient duration to braze the metal coating to the base material as a layer of metal particles less than 0.125-inch thick, bonded together and to the base material in random stacked relation as a uniform matrix with interstitial and interconnected pores between adjacent particles having equivalent pore radii between 0.1 and 4.5 mils.

As stated in aforementioned U.S. Pat. No. 3,384,154, the porous boiling layer should be thin in the interest of material economy and boiling performance. In the present invention, there is another important reason for limiting the thickness of the porous layer, and specifically to a thickness less than 0.125 inch. If a thick layer is produced using the fused-salt brazing flux described herein, then the salt cannot be completely removed from the porous matrix after brazing. The flux is hygroscopic and corrosive to the matrix metal, and if allowed to remain, it will cause corrosion and disintergration of the porous layer. Moreover, residual solidified salts will fill pores in the matrix and prevent proper boiling performance of the surface.

When the newly brazed porous layer is cooled, the flux resolidifies compactly throughout the interstices of the matrix forming with the metal an essentially solid, nonhomogeneous structure. Moreover, the flux contains components such as the fluorides and complex oxides which are difficult to dissolve. Although difficult to dissolve, the solidified flux is soluble in dilute acid ($HNO_3$), but the problem remains to get the wash liquid to circulate into the minute labyrinth of pores and subsurface interconnections. A fine matrix of this type can be washed clean of flux provided the wash liquid can be forcibly flowed through the matrix in the manner of a filter. However, forced through-flow cannot be readily accomplished when a porous layer is bonded to a solid heat transfer wall. A rapid flow of wash liquid across, rather than through the surface, does not induce penetration to a substantial depth. The pores are very small, and strong capillary forces hold the wash liquid stagnant in the matrix except for a stratum near the surface. Even the direct impingement of wash liquid against the surface will not circulate the liquid through cavities at an appreciable depth—the force of the impingement being quickly dissipated by the surface stratum of the fine matrix.

It has been discovered, however, that a fine porous layer suitable for use as the nucleate boiling surface of U.S. Pat. No. 3,384,154 can be washed clean of flux by the use of stringent but ordinary washing procedures, provided that the porous layer is less than about 0.125 inch in thickness. If the thickness is so limited, effective flux removal can be accomplished with a reasonable amount of washing either by crossflow or impingement. If desired, periods of washing may be interrupted by periods of soaking. It is believed that the washing mechanism is dependent upon diffusion of the wash liquid between zones of different salt solution concentration. In a thin porous layer, the concentration gradients are high and are capable of promoting a practical rate of salt removal.

An essential characteristic of porous surface layers is interconnected pores of capillary size, some of which communicate with the outer surface. Liquid to be boiled enters the subsurface cavities through the outer pores and the subsurface interconnecting pores, and is heated by the metal forming the walls of the cavities. At least part of the liquid is vaporized within the cavity and the resulting bubble grows against the cavity walls. A part thereof eventually emerges from the cavity through the outer pores and thence rises through the liquid film over the porous layer for disengagement into the gas space over the liquid film. Additional liquid flows into the cavity from the interconnecting pores and the mechanism is continuously repeated.

The high boiling coefficient results from the fact that the heat leaving the base metal surface does not have to travel through an appreciable liquid layer before meeting a vapor-liquid surface producing evaporation. Within the porous layer, a multitude of bubbles are grown so that the heat, in order to reach a vapor-liquid boundary, need travel only through an extremely thin liquid layer having a thickness considerably less than the minute diameter of the confining pore. Vaporization of liquid takes place entirely within the pores and substantially no superheating of the bulk liquid is required or can occur.

It will be apparent from the foregoing description that the porous layer must be structurally stable, reasonably uniform throughout its cross section, with interconnected pores of capillary size having a controllable and reproducible equivalent pore radius. As used in this context, the "equivalent pore radius" empirically defines a porous boiling layer, having varied pore sizes and nonuniform pore configurations, in terms of a single average pore dimension. In general, for boiling liquids having relatively low surface tension such as the cryogens oxygen and nitrogen, the equivalent pore radius is preferably relatively small, e.g., between 0.1 and 2.5 mils. Conversely with boiling liquids having relatively high surface tension such as water, the equivalent pore radius should be relatively large, e.g., between 1.5 and 4.5 mils.

In view of these unique requirements of porous surface layers and the recognition that the brazing flux contains relatively insoluble constituents that must be completely removed to avoid corrosion of the porous layer, it was surprising that they could be prepared by the instant method. That is, one would logically expect that the insoluble and corrosive constituents of the brazing flux would be permanently trapped within the matrix and would corrode the metal particles rapidly so as to structurally disintegrate the porous layer. Contrary to this expectation the insoluble components may be completely removed from the thin porous layer subsequent to the brazing step of the instant method, and the resulting porous surface is structurally stable.

DESCRIPTION OF PREFERRED EMBODIMENTS

A. Matrix Component

The metal powder which is to provide the basic porous structure is a heat-conductive metal in order that heat may be transferred with minimum resistance across the relatively minute areas of bonding between the particles. The matrix metal must be chosen to be brazable to itself and to the base metal wall through the aforementioned elemental metal bonding component. The resulting particle bond must be strong, scratch resistant, and capable of withstanding the considerable temperature change expected in heat exchange service.

Any of the aluminum-based metals or alloys used by the prior art as brazable materials are suitable as the matrix powder and as the base material. The metal or alloy must have a melting point above that of the elemental metal bonding component and of the brazing flux powder. The melting point of the vase metal and matrix component should not be less than about 1,050° F. which is about 100° F. above the minimum brazing temperature afforded by molten salt fluxes. Suitable alloys are those including small quantities of copper (e.g., 0.25 percent Cu), manganese (e.g., 1.2 percent Mn) or silicon (e.g., 0.7 percent Si). It should be also be recognized that the base material may comprise a clad-sheet in which a 100 percent aluminum sheet is coated with an aluminum-alloy base coating. In this instance, the powder matrix must be selected on the basis of compatibility with the aluminum-alloy cladding.

Although the brazing flux acts to remove the oxide film from the powder matrix during brazing, it has been discovered that mechanically stronger porous layers are formed if the powder matrix component is precleaned with a suitable acid before mixing with the other components to form the slurry. The oxide film is very thin (20–100 A.) but the matrix component in powder form possesses high specific surface area (greater than 200 sq. ft. per lb. powder) and therefore the powder will normally contain a considerable amount of aluminum oxide. However the brazing flux does not usually dissolve more than a few percent of its own weight of aluminum oxide. Accordingly, when such large surface areas of powder must be treated with a relatively small amount of brazing flux, the latter tends to become saturated with oxide if the matrix component is not precleaned.

Fortunately, the matrix component is adequately precleaned when only a small portion of the powder has reacted with the acid, e.g., 2 weight percent. Two aqueous acid solutions have been found particularly suitable for precleaning the powder matrix component, phosphoric acid (4–10 weight percent $H_3PO_4$) and buffered sulfuric acid (20–30 weight percent $H_2SO_4$, 20 weight percent $Na_2SO_4$, and 50–60 weight percent $H_2O$). To avoid excessive reaction, the powder is preferably precleaned at ambient temperature in small batches, e.g., 100 lb. using only sufficient acid solution to fill the voids and slurry the powder. A few minutes' induction period is required for the acid to penetrate the oxide coating. Thereafter the reaction with the base aluminum beneath proceeds rapidly until the acid is consumed. The powder is then thoroughly washed with water to remove all acids, then rinsed with an organic liquid such as methyl alcohol to remove the water followed by at least partial drying before mixing with the other components to form the slurry.

The particles comprising the matrix powder may be any shape, e.g., spherical, granular, or even thin flakes. They may comprise a wide variety of sizes, but at least some particles should be sufficiently small to pass through 35-mesh screen (based on United States standard screen series) in order to produce pores of sufficiently small dimension to become active as nucleation sites at low $\Delta T$. If the particles are too large, they tend to settle out in the slurry and produce a reduced number of boiling cavities in the porous layer. Also, if the matrix metal powder is too fine, it oxidizes readily and is difficult to clean and achieve good bonding. High boiling coefficients have been obtained with surfaces produced with particles ranging from 40 screen mesh (17-mil openings) to 400 mesh (1.5-mil openings).

In general, large particles produce porous layers having relatively large equivalent pore radii, which in turn are preferred for boiling liquids having relatively high surface tension. The converse is also true. It should be noted, however, that there is no precise correlation between matrix metal particle size and equivalent pore radii. This is partly because the individual particles used to prepare a given porous layer are not necessarily the same shape, nor do these particles necessarily correspond in shape to the particles of different mesh size used to prepare other porous layers. Moreover, the particles are stacked in random relation on the thermally conductive wall, and sizes of the interstitial and interconnecting pores may vary considerably.

The equivalent pore radius for a particular porous layer as described herein is determined by the method described in the aforementioned Milton U.S. Pat. No. 3,384,154. In this method, one end of the porous layer is vertically immersed in a freely wetting liquid and the capillary rise of the liquid is measured along the surface of the porous boiling layer. When determined in this manner the equivalent pore radius, $r$ (in ft.), is equal to $2\sigma/ph$ where: $p$ is the density (in lbs. mass/cu. ft.) of the liquid in which an end of the porous boiling layer is vertically immersed, $\sigma$ is the surface tension (in lbs. force/ft.) of the liquid in which an end of the porous boiling layer is vertically immersed, and $h$ is the vertical capillary rise (in ft.) of the liquid along the surface of the porous boiling layer.

The advantage in choosing a freely wetting liquid to determine the equivalent pore radius is that the liquid phase contact angle ($\theta$), which the liquid surfaces make with the materials of which the porous boiling layer is composed, will be very small and, therefore, will not affect the determination. If a freely wetting liquid is not chosen, the expression $2\sigma/ph$ must be equated to $r/\cos\theta$ and the contact angle ($\theta$) will have to be accounted for in determining the value of the equivalent pore radius ($r$). Since the exact measurement of the contact angle is difficult and unnecessarily introduces risk of error, it is preferable to use a freely wetting liquid to determine the equivalent pore radius. Liquids exhibiting a contact angle of less than 20° with the material of which the porous boiling surface layer is composed are defined as "freely wetting" for this purpose and may be used without having to account for the effect of the contact angle since cos 20° is 0.95 and the error resulting from neglecting the contact angle will be less than 5 percent.

Examples of suitable liquids which freely wet aluminum porous layers are methanol, fluorotrichloromethane, dichlorotetrafluoroethane, acetone, ethyl chloride, liquid oxygen and liquid nitrogen. The particular liquid chosen for determination of the equivalent pore radius should preferably be a good solvent for oil and grease so that the effect of the presence of these common surface contaminants will be minimized. Pure water is not considered to be a freely wetting liquid inasmuch as its contact angle ($\theta$) with an aluminum surface, for example, is about 66°.

The equivalent pore radius is independent of the properties of the material used to construct the porous boiling layer. It defines qualitatively the geometrical and dimensional characteristics of the porous boiling layer itself. The equivalent pore radius should not be employed to predict the quantitative performance of any particular porous boiling layer inasmuch as such performance will depend, inter alia, on the material of which the porous boiling layer is constructed and the liquid which is to be boiled.

To illustrate the method of determining the equivalent pore radius, consider the following data and computation for the 80–100-mesh porous surface, item 3 of table I. A small strip of aluminum sheet with the porous surface applied thereon was suspended vertically with one end immersed in fluorotrichloromethane. The liquid wetted the surface by capillary action to a height $h$ above the liquid surface of 0.115 ft. Fluorotrichloromethane has a surface tension of $1.30\times10^{13}$ lbs./ft. and a density of 91.4 lb./cu ft. Substituting these values into the equivalent pore radius equation gives a value for $r$ of $2.48\times10^{10h4}$ ft. or 3.0 mils.

Table I, column 2, summarizes the values of the effective pore radius determined experimentally for a number of porous aluminum boiling layers prepared by the method of the present invention in freely wetting liquids—specifically methanol, fluorotrichloromethane, and dichlorotetrafluoroethane. Column 3 of table I shows the values of temperature differences required by the several surfaces to transfer 3,000 B.t.u./hr. sq. ft. while boiling fluorotrichloromethane at one atmosphere pressure. Since Q/A is held constant at 3,000, the only variables in the heat transfer equations are $\Delta T$ and $h$, and these variables are inversely proportional. Consequently a decrease in the required $\Delta T$ by a factor of 10 will increase the heat transfer coefficient $h$ by a factor of 10. Thus, column 3 of table I provides a means of comparing the heat transfer capabilities of the various surfaces in a common fluid.

TABLE I

| Surface | Equivalent Pore Radius (in mils) | T(°F) Required for Q/A =3,000 Btu/hr. sq. ft. |
|---|---|---|
| Porous Boiling Layers | | |
| 1. Aluminum, 140–270 mesh granular, flat plate | 1.75 | 1.0 |
| 2. Aluminum, 35–60 mesh granular, flat plate | 2.75 | 1.7 |
| 3. Aluminum, 80–100 mesh granular, flat plate | 3.0 | 2.5 |
| 4. Aluminum, 40–400 mesh granular, flat plate | 3.4 | 2.5 |
| Smooth Surface | | |
| Smooth aluminum plate (exhibits no capillarity | non porous | 22.5 |

B. Brazing Flux

As previously indicated, the function of the brazing flux is to remove aluminum oxide film from the base material and the matrix component. The brazing flux includes alkali metal chloride as the major constituent, and metal fluoride and reactive metal halide selected from the group consisting of cadmium bromide, cadmium chloride, zinc bromide and zinc chloride as minor constituents. Several of the commonly used aluminum brazing fluxes are suitable and described in U.S. Pat. No. 2,229,164 and No. 2,299,168 to M. Miller. Other suitable aluminum brazing fluxes are described in U.S. Pat. No. 3,066,405.

The alkali metal chlorides are present in these fluxes to act as a fluid carrier or solvent for the more active components. They also stabilize and reduce the reactivity of the more active components. In preferred practice of this invention, two or more alkali metal chlorides are combined in such proportions as to exhibit a lower melting point of the combination than any of its single components.

Aluminum oxide is soluble in a fluoride salt of such metals as sodium, lithium, and potassium, and such salts are usually present in quantity of about 1–15 weight percent of the brazing flux content to promote oxide solution in the molten flux. The fluoride salt content is maintained relatively small because its presence tends to undesirably raise the melting point of the flux.

Another component of the brazing flux is a reactive metal halide selected from the group consisting of Zn Cl₂, Zn Br₂, Cd Cl₂ and Cd Br₂. These reactive metal halides (heavier than the aforementioned alkali metal chlorides) serve to lower the melting point of the flux and reduce its surface tension so that it flows freely and wets the surfaces thoroughly. This is especially important in the present invention, since thorough fluxing of a multitude of capillary size pores and passages is necessary.

The reactive metal halide penetrates the oxide film and reacts with the aluminum metal beneath the film, forming a gaseous product such as aluminum trichloride. The oxide film is thus "undermined" and loosened, and sloughs off the surface. The reactive metal which is released in the decomposition of the halide alloys with other metal present in the system and the alloy is molten at the brazing temperature. The deposited metal from the reactive metal halide thereby constitutes a portion of the bonding component in the brazing process and is accordingly referred to herein as the "reactive metal" component.

The chemical reactivity of the reactive metal halide is beneficial and essential, and an extraordinary amount of this component should be provided in order to remove the relatively large amount of oxide present on the aluminum in particulate form. Nevertheless, the extent of the reaction and the amount of the reactive component must be controlled and limited. Excessive attack on the aluminum matrix material is detrimental because it reduces the particle size of the matrix component (hence, reduces the size of the pores and interconnecting passages) and because it thins and weakens the heat transfer wall. Moreover, the gaseous products released in the reaction are obnoxious and tend to produce gross voids and blisters in the surface layer. Another problem associated with the reactive metal halides is that a fraction of the products of the reaction are not gaseous halides, but instead are solid, insoluble oxyhalides which remain permanently within the pores and form weak unbonded filler material in the matrix. This is undesirable both structurally and functionally. In view of the foregoing considerations the chloride form of the reactive metal halides should be limited to about 10 weight percent of the flux. The bromides are less reactive than the chlorides and may be present in greater proportions, e.g., 30 weight percent of the flux without detriment. Bromides are preferred in this invention because their reactivity is lower and more controllable and because they have a more pronounced depressing effect on the melting point of the flux.

Table II lists several exemplary brazing flux compositions (on a weight percent basis) suitable for use in this invention. Compositions numbers 2 and 6 are preferred, the latter being especially suitable because its high metal bromide content permits relatively low brazing temperatures, e.g. 950° F.

Table II

| Component | Brazing Flux Number | | | | | |
|---|---|---|---|---|---|---|
| | 1 | 2 | 3 | 4 | 5 | 6 |
| LiCl | | 18 | 22 | 17 | 32 | 9 |
| NaCl | 26 | 30 | 22 | 17 | | 19 |
| KCl | 54 | 36 | 30 | 24 | 44 | 27 |
| LiF | 8 | 8 | 7 | 6 | 4 | 7 |
| ZnCl₂ | 12 | 8 | | | | |
| ZnBr₂ | | | 18 | 36 | 19 | 38 |
| Melting Point (°F) | 1090 | 950 | 750–950 | 750–950 | 750–950 | 750–950 |

The limits on the amount of reactive metal supplied as heavy metal halide can be expressed more significantly in terms of a mol ratio to the matrix component. Thus, the molar ratio of reactive metal to matrix component should be less than 0.1 in order to avoid the detrimental effects of excessive chemical activity during the brazing step.

C. Bonding Component

Because of the high surface area of the matrix material, a substantial amount of the aforementioned metal bonding component must be provided in order to insure that particle contact points are securely bonded. The molar ratio of total bonding component to matrix powder should be at least 0.05, and substantially higher values of this ratio are preferred. As stated previously, a portion of this bonding component will be provided by the decomposition of the reactive metal halide. However, despite the fact that reactive metal may be introduced up to a ratio of 0.1 to the matrix powder, the reactive metal halide cannot be relied upon to furnish all of the bonding component needed, even when the total to be supplied is a molar ratio of only 0.05. This is because only that fraction of the reactive metal halide which penetrates and contacts the aluminum will be decomposed to furnish bonding metal, and the balance will remain dissolved and unreacted in the molten flux.

Moreover, cadmium alone will not alloy readily with aluminum matrix material at a temperature below the melting point of aluminum. Hence, the bond formed by cadmium between aluminum bodies is similar to a soft solder joint rather than a brazed joint and is relatively weak. In this case, another metal is needed which will increase the solubility of the matrix and bounding components at the temperature of brazing.

In order to insure that the requisite amount and type of bonding component is available, an additional quantity of elemental bonding metal is provided in powder form. The elemental bonding component should be chosen to have a melting point lower than those of the matrix component and the base material, and to alloy readily with the matrix component and the base material. Suitable elemental bonding component materials are zinc and aluminum alloys containing 7 to 13 weight percent silicon. To insure adequate bonding material for a structurally sound porous layer, the elemental bonding component should be provided in quantity such that the molar ratio thereof to the matrix component is at least 0.02. However, the molar ratio should not exceed 0.15, as excessive amounts of the matrix component and base material will be dissolved into the molten metal phase and the resultant coating will be largely solid rather than porous.

In addition to the aforementioned limits on the addition of reactive metal and elemental bonding metal, the method of this invention requires use of flux recipes conforming to limits on the total combined bonding component supplied in both elemental and chemically combined forms. The molar ratio of total available bonding metal to matrix metal should be between 0.05 and 0.20. This range allows for the addition of chemically bound bonding component (reactive metal) but contemplates that only a portion thereof will be deposited as bonding metal.

TABLE III

| Component ratios | Mole ratios | | | | | | |
|---|---|---|---|---|---|---|---|
| | 1 | 2 | 3 | 4 | 5 | 6 | 7 |
| Zn°/Al | 0 | 0.052 | 0.032 | 0.021 | 0.025 | 0.042 | 0.124 |
| Zn⁺²/Al | 0.061 | 0.012 | 0.025 | 0.051 | 0.074 | 0.074 | 0.041 |
| Total Zn*/Al | 0.061 | 0.064 | 0.056 | 0.072 | 0.099 | 0.116 | 0.165 |
| Zn°/total Zn*+Al | 0 | 0.049 | 0.030 | 0.019 | 0.023 | 0.038 | 0.107 |
| Zn⁺²/total Zn*+Al | 0.058 | 0.011 | 0.023 | 0.048 | 0.067 | 0.066 | 0.036 |
| Total Zn*/total Zn*+Al | 0.058 | 0.060 | 0.053 | 0.067 | 0.090 | 0.104 | 0.143 |

*Total Zn comprises Zn° plus Zn⁺².

Recipes 1–6 were prepared with brazing flux composition 2 of table II, and recipe 7 included brazing flux of composition 6 from table II. It should be noted that recipe 1 did not include an elemental metal bonding component of this invention whereas recipes 2–7 included zinc as the sole elemental bonding component. The molar ratios of elemental zinc to the aluminum matrix component are between 0.021 (recipe 4) and 0.124 (recipe 7), so that all recipes other than 1 are within the claimed molar ratio range of 0.02 and 0.15. The molar ratios of reactive zinc ($Zn^{+2}$) to the aluminum matrix component are between 0.012 (recipe 2) and 0.074 (recipes 5 and 6), so that recipes 2–7 are below the 0.1 upper limit of this invention. The molar ratios of elemental plus reactive zinc (total Zn) to aluminum matrix component are between 0.056 (recipe 3) and 0.165 (recipe 7) so that recipes 2–7 are within the 0.05 to 0.20 range of this invention.

It is significant that porous layers having Brinell hardness of 6–10 were prepared from recipes 2–7 according to the method of this invention and were deemed to be of sufficient mechanical strength as they could not be scraped off with a blunt instrument. The porous layer prepared from recipe 1 (without elemental zinc bonding component) was easily pealed off (by hand) from the aluminum base material and therefore unsatisfactory.

D. Vehicle

The function of the vehicle is to temporarily suspend the matrix, bonding and flux ingredients of the mixture and form a slurry preferably having a paintlike consistency. Suitable vehicles must be liquid at room temperature, relatively nonreactive chemically with the other ingredients, have high volatility and low latent heat. The preferred vehicle is methyl alcohol, although other organics such as acetone or ethyl alcohol could be used. Water is also satisfactory but the slurry cannot be stored and must be used promptly, else undesirable reactions will occur between the ingredients. The vehicle is evaporated during the heating (and brazing) step leaving a dry, hard thin layer preferably about 10 mils thick. The quantity of vehicle is determined to afford a slurry of desired viscosity, preferably about 3,000 centipoise for producing porous layers about 8–12 mils thick.

The slurry composition depends to some extent on the method of applying same to the base material. As used herein, the step of "loosely coating" the base material with the slurry contemplates all methods by which the slurry is applied without appreciable external pressure, e.g., spraying, dipping the base metal into the slurry, or pouring the slurry onto the base metal. The porous layer is characterized by interconnecting pores, and such open structure may not be prepared from a compacted or extruded layer.

When the base material is coated by spraying the slurry thereon, there is apparently sufficient adhesion to avoid separation of the slurry into liquids and solids. However, when the dipping or pouring techniques are used, there is a tendency towards the two-phase separation. This problem may be greatly reduced by using relatively fine flux and powder matrix components, e.g., 270–400 mesh.

When elemental zinc powder is added, the slurry described above should be used within 24 hours after its preparation. If the slurry is allowed to stand for longer periods, the porous layer formed therefrom tends to be structurally weak and may be peeled off the base material. This is due to the presence of two dissimilar metals, aluminum and zinc, in the slurry which establish galvanic conditions resulting in undesired chemical reactions in terms of corrosion, along with the formation of aluminum hydroxide. This slurry deterioration is accelerated under conditions of agitation (mixing and stirring), high temperature (90–100° F.), and the presence of oxygen, moisture, or various impurities.

With zinc powder, the shelf life of the slurry can be increased to a very long period by adding a suitable corrosion inhibitor, such as a 5-weight-percent aqueous solution of sodium chromate ($Na_2CrO_4$). The inhibition mechanism is believed to be a reaction between the sodium chromate and the aluminum in the slurry to form a thin protective film which does not interfere with the subsequent brazing of the matrix component. Another less convenient method of increasing the shelf life of the slurry is by freezing same.

One slurry having the general consistency of aluminum paint and used to prepare a satisfactory porous layer according to the invention has the following composition:

| Slurry Ingredients | Approx. % by weight |
| --- | --- |
| Aluminum powder, 115–400 mesh | 36.0 |
| Zinc dust, 115–400 mesh | 11.0 |
| Potassium chloride | 8.7 |
| Sodium chloride | 6.0 |
| Lithium chloride | 2.9 |
| Zinc bromide | 13.0 |
| Lithium fluoride | 2.2 |
| Sodium chromate (inhibitor) | 0.2 |
| Water | 2.0 |
| Methyl alcohol (vehicle) | 18.0 |

This particular slurry includes the brazing flux composition No. 6 from table II, and outstanding porous layers have been formed therefrom at brazing temperatures of about 950° F. Accordingly, it is especially suitable when the porous layers are to be formed on internal passages of heat exchangers assembled by brazing.

To obtain a strong mechanical bond between the porous layer and the base material, it is necessary to acid-clean the base material prior to loosely coating same with the slurry. A suitable cleaning treatment includes dipping the base material in 5-weight-percent aqueous solution of sodium hydroxide for 1–2 minutes, then rinsing in either 50 percent nitric acid aqueous solution or a sulfuric acid-sodium chromate solution for 5 minutes to remove the black sodium aluminate residue left by the caustic. After cleaning, the base metal should be dried.

To form the porous layer on the internal boiling side passages of an assembled heat exchanger, these passages are first cleaned and dried, after which the slurry is loosely coated thereon by any convenient technique, as for example, spraying, dipping or pouring. The viscosity of the slurry is preferably adjusted to obtain coating thickness of 10–15 mils. The excess slurry is allowed to drain off the coated passages. The slurry-coated metal surface is then heated to about 150°–300° F. for sufficient duration to evaporate the vehicle and form a dried metal coating. The latter is then further heated to about 950°–1,000° F. rapidly in an inert atmosphere for about 1 hour. Nitrogen can be employed as the inert atmosphere although argon is preferred because it results in a stronger matrix. Such atmosphere is employed in order to minimize reaction of the components of the dried slurry with atmospheric oxygen. During this heating step, the flux becomes molten and the reactive metal halide component commences to remove the aluminum oxide from the surfaces of the powder matrix and base material. Metal is deposited on the surfaces as the reactive halide decomposes. When the assembled heat exchanger contains brazed structural joints, the elemental metal bonding component should be zinc. Both the elemental zinc metal and the metal deposited from the reactive halide begin to alloy with the aluminum at temperatures exceeding about 790° F. During brazing, the coating is held against the base metal by surface tension and without external pressure. In this manner, the porous surface brazing temperature may be maintained safely below the softening temperature of either the base metal or any brazed aluminum joints previously formed in the assembly. The latter is then cooled to ambient temperature and the porous layer washed thoroughly with a dilute solution of $HNO_3$ to remove solidified flux imbedded within the porous metal matrix.

Several aluminum porous layers prepared from the recipe 2–6 slurries and according to the instant method were tested for boiling liquid oxygen. These layers were mechanically sound and provided boiling heat transfer coefficients of 3,500–5,000 B.t.u./hr.-sq.ft.-° F. at heat fluxes between 1,000 and 10,000 B.t.u./hr.-sq.ft. This performance is considered outstanding and far superior to commonly used heat exchangers.

Although preferred embodiments of the invention have been described in detail, it is contemplated that modifications of the method may be made and that some features may be employed without others, all within the spirit and scope of the invention.

What is claim is: a porous

1. A method for forming a porous aluminum layer on aluminum base material comprising the steps of:
  a. providing a cleaned power matrix component having at least some particles sufficiently small to pass through a 35-mesh screen and selected from the group consisting of aluminum and aluminum-base alloys: metal bonding component in powder from and quantity such that the molar ratio thereof to said matrix component is between about 0.02 and 0.15, said metal bonding component being selected from the group consisting of a elemental zinc and aluminum alloy having 7 to 13 percent by weight silicon, a brazing flux powder including alkali metal chloride as the major constituent, and reactive metal halide and alkali metal fluoride as minor constituents said reactive metal halide being selected from the group consisting of cadmium bromide, cadmium chloride, zinc bromide and zinc chloride, the molar ratio of said reactive metal to said matrix component being less than 0.1, and the molar ratio of said elemental metal bonding component plus said reactive metal to said matrix component being between 0.05 and 0.20; and an inert liquid vehicle for said matrix component, metal bonding component and brazing flux;
  b. mixing said matrix component, metal bonding component, and brazing flux in said vehicle to form a slurry;
  c. providing base material selected from the group consisting of aluminum and aluminum alloys, and cleaning said base material;
  d. loosely coating the cleaned base material with said slurry and heating the slurry-coated base material to temperature below 300° F. and sufficient to evaporate said liquid vehicle and form a dried metal-containing coating on said base material; and
  e. further heating the coated base material in an inert atmosphere to temperature between about 950° and 1,200° F. and for sufficient duration to braze said metal of said coating to the base material as a layer of metal particles less than 0.125 inch thick, bonded together and to said base material in random stacked relation as a uniform matrix with interstitial and interconnected pores between adjacent particles having equivalent pore radii between 0.1 and 4.5 mils.

2. A method according to claim 1 in which elemental zinc comprises said metal bonding component.

3. A method according to claim 1 in which zinc bromide comprises said reactive metal halide.

4. A method according to claim 1 in which said brazing flux comprises on a weight basis: 18 percent lithium chloride, 30 percent sodium chloride, 36 percent potassium chloride, 8 percent lithium fluoride, and 8 percent zinc chloride.

5. A method according to claim 1 in which said brazing flux comprises on a weight basis; 9 percent lithium chloride 19 percent sodium chloride, 27 percent potassium chloride, 7 percent lithium fluoride, and 38 percent zinc bromide.

6. A method according to claim 1 in which methanol comprises said liquid vehicle.

7. A method according to claim 1 in which said slurry comprises on a weight basis: 36 percent aluminum powder of between about 115 and 400 mesh size as said matrix component, 11 percent zinc powder of between about 115 and 400 mesh size as said metal bonding component, 2 percent water, 0.2 percent sodium chromate as a corrosion inhibitor, 18 percent methanol as said liquid vehicle, and 2.9 percent lithium chloride, 6.0 percent chloride, 8.7 percent potassium chloride, 2.2 percent lithium fluoride, and 13 percent zinc bromide as said brazing flux.

8. A method according to claim 1 in which said powder matrix component is cleaned in a dilute acid solution, and thereafter washed in water, rinsed in organic solvent and dried prior to said mixing.

9. A method according to claim 1 in which the viscosity of said slurry is sufficient to provide a coating thickness of between about 10 and 15 mils on said base material.

10. A method according to claim 1 in which said base material is a heat exchanger assembly with parts brazed together at temperature above 1,000 ° F. but below the melting point of aluminum, and said base material is coated according to steps (a) through (e) and the metal-coated base material is further heated according to step (e) at temperature below 1,000° F. to braze said metal coating to said base material as a porous layer of metal particles.